(12) United States Patent
Kuo

(10) Patent No.: US 6,237,965 B1
(45) Date of Patent: May 29, 2001

(54) LEAK-FREE FLEXIBLE CONDUIT

(76) Inventor: Hsien-wen Kuo, No. 93, Sec. 4, Chin-Hwa Rd., Tainan (TW)

( * ) Notice: Subject to any disclaimer, the term of this patent is extended or adjusted under 35 U.S.C. 154(b) by 0 days.

(21) Appl. No.: 09/361,163

(22) Filed: Jul. 27, 1999

(51) Int. Cl.$^7$ ........................................ F16L 27/00
(52) U.S. Cl. ..................... 285/145.3; 285/261; 285/906; 285/111
(58) Field of Search .......................... 285/261, 263, 285/111, 145.3, 906, 404

(56) References Cited

U.S. PATENT DOCUMENTS

| | | | |
|---|---|---|---|
| 3,663,043 | * 5/1972 | Walton | 285/261 |
| 3,799,586 | * 3/1974 | Caras et al. | 285/261 |
| 4,618,154 | * 10/1986 | Freudenthal | 285/111 |
| 4,776,617 | * 10/1988 | Sato | 285/906 |
| 4,848,808 | * 7/1989 | Pannell et al. | 285/404 |
| 5,740,839 | * 4/1998 | Kuo et al. | 285/145.3 |
| 5,941,576 | * 8/1999 | Krausz | 285/111 |
| 6,056,329 | * 5/2000 | Kitani et al. | 285/145.3 |

* cited by examiner

Primary Examiner—Teri Pham Luu
(74) Attorney, Agent, or Firm—Rosenberg, Klein & Lee

(57) ABSTRACT

A leakage free flexible conduit has made several improvements against the conventional, a groove formed on the inner rim of the connector for receiving a packing, and outside of a seat extending from an outer sliding pipe having a engaging trough for receiving a leak-free unit, the leak-free unit is formed by a harden plastic ring with a harden padding seating therein to prevent from leakage; the connector has an inner packing and the leakage free ring of the outer sliding pipe are both formed with a recess; the outer sliding pipe has a flange to secure a pair half circular plate forming a fixture, the fixture has extending a flange from one side corresponding to the flange of the outer sliding pipe, the other side of the fixture has a confine flange corresponding to the inner sliding pipe, inside of the flange, there is a leakage prevention ring against the outer wall of the inner sliding pipe.

6 Claims, 8 Drawing Sheets

LEAK-FREE FLEXIBLE CONDUIT

BACKGROUND OF THE INVENTION

1. Field of the Invention

This invention relates to leak-free flexible conduit, and in particular to a pipe for connecting pipes together without causing leakage, especially to vary its sizes with the temperature changing and still maintain a leak free.

2. Prior Art

The conventional fluid pipe embedded underground requires to be expanded and shrunk with the change of temperature, therefore, they are all designed to be flexible adjustment. One type of which is shown as in FIG. 8 which is mainly composed of a retaining bracket A, a connector B, a packing C, an outer sliding pipe D, an inner sliding pipe E, a gasket F, a fixture G and dust cover H. The retaining bracket A has a circular trough A1 at inside to receive the outer sliding pipe D therein, and the retaining bracket A has a disc A2 at the flange and is formed with apertures A21 thereon. The outer sliding pipe D has a flat end and an arc end, respectively, whereas the flat end is formed with a block D1, thus the outer sliding pipe D is secured to the disc A2 of the retaining bracket A by the connector B, with the arc end sleeved with a packing C and engages to the inner edge of the trough A1 of the retaining bracket A. The connector B is covered by the dust cover H. Further, the inner sliding pipe E has a flange E1 corresponding to the inner diameter of the outer sliding pipe D, and is connected to the block D1 by means of a fixture G. The inside of the outer sliding pipe D has a gasket F which in corporation with the outer flange of the inner sliding pipe E forms a packing connection to prevent leakage. When the outer and the inner sliding pipes D and E are sliding with respect to each other, the block E1 of the inner sliding pipe E will engage to the fixture G and confine its movement.

There are some shortcomings exist on the prior of art which are:
1. The packing C is sleeved in the center between the arc pipe of the outer sliding pipe D and the inner edge of the retaining bracket A, if the flexing angle is unbalancing, the packing C has an uneven force, thus fluid may be spilled from a loosen place of the connector.
2. The outer sliding pipe D and the inner sliding pipe E are connected by a fixture G which has not any connection with the outer sliding pipe D, when an earthquake happens, the outer sliding pipe D will flex which causes the block D1, the inner sliding pipe E and the fixture G to loose causing leakage.

SUMMARY OF THE INVENTION

It is the primary object of the present invention to provide a leak-free flexible conduit which is flexible and endurable to prevent fluid from leakage.

It is another object of the present invention to provide a leak-free flexible conduit which is easy to secure.

It is a further object of the present invention to provide a leak-free flexible conduit which is less expensive in manufacture.

BRIEF DESCRIPTION OF THE DRAWINGS

FIG. 2A is an enlarged cross sectional view showing a leak-free unit of FIG. 2;

FIG. 2B is an enlarged cross sectional view showing a packing of the present invention of FIG. 2;

FIG. 2C is an enlarged cross sectional view showing a retainer of the present invention of FIG. 2;

DETAILED DESCRIPTION OF THE PREFERRED EMBODIMENTS

Figure 1:
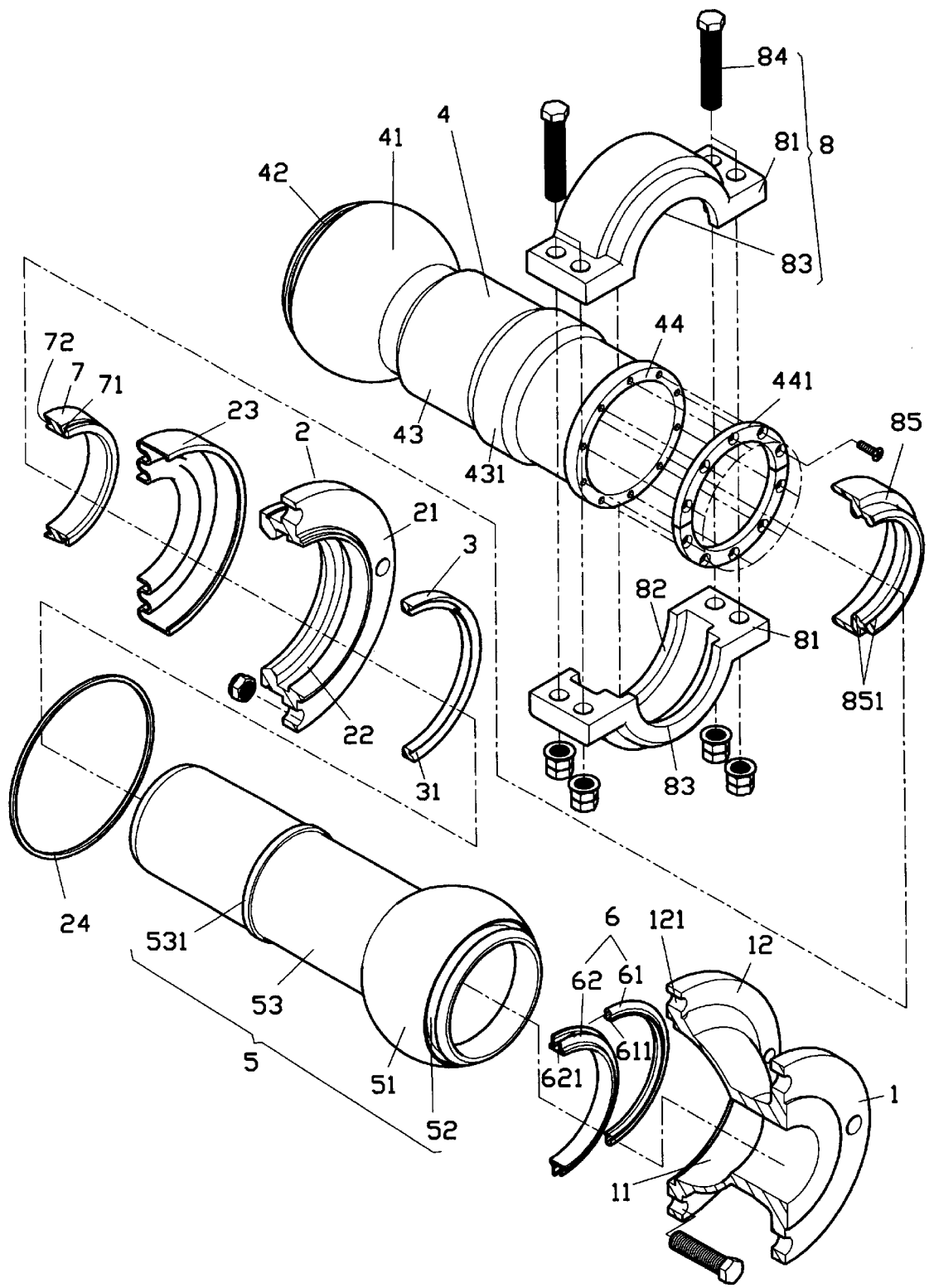
FIG. 1 is an exploded view of the present invention.
Figure 2:
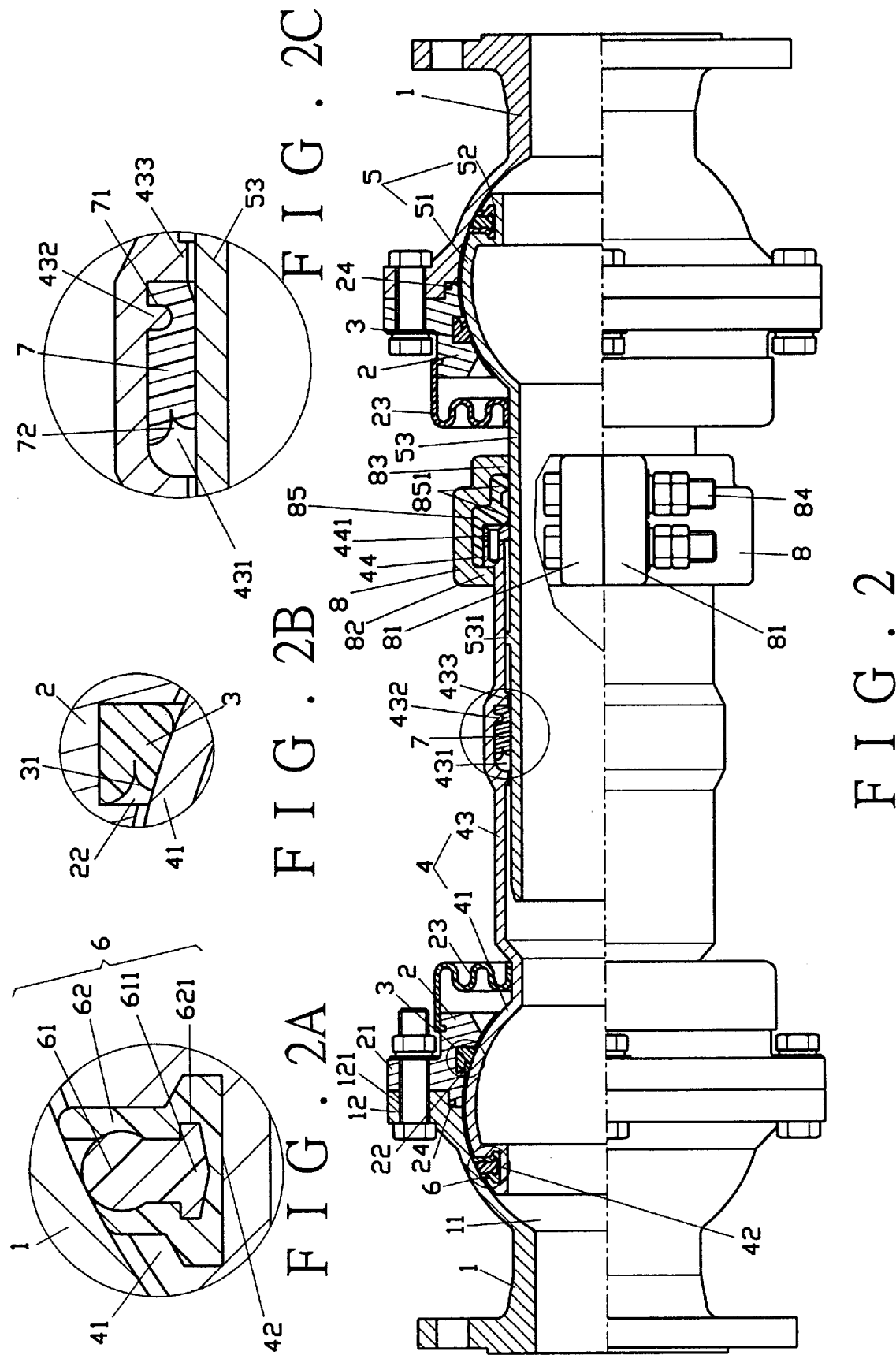
FIG. 2 is a cross sectional view of the present invention.
Figure 3:
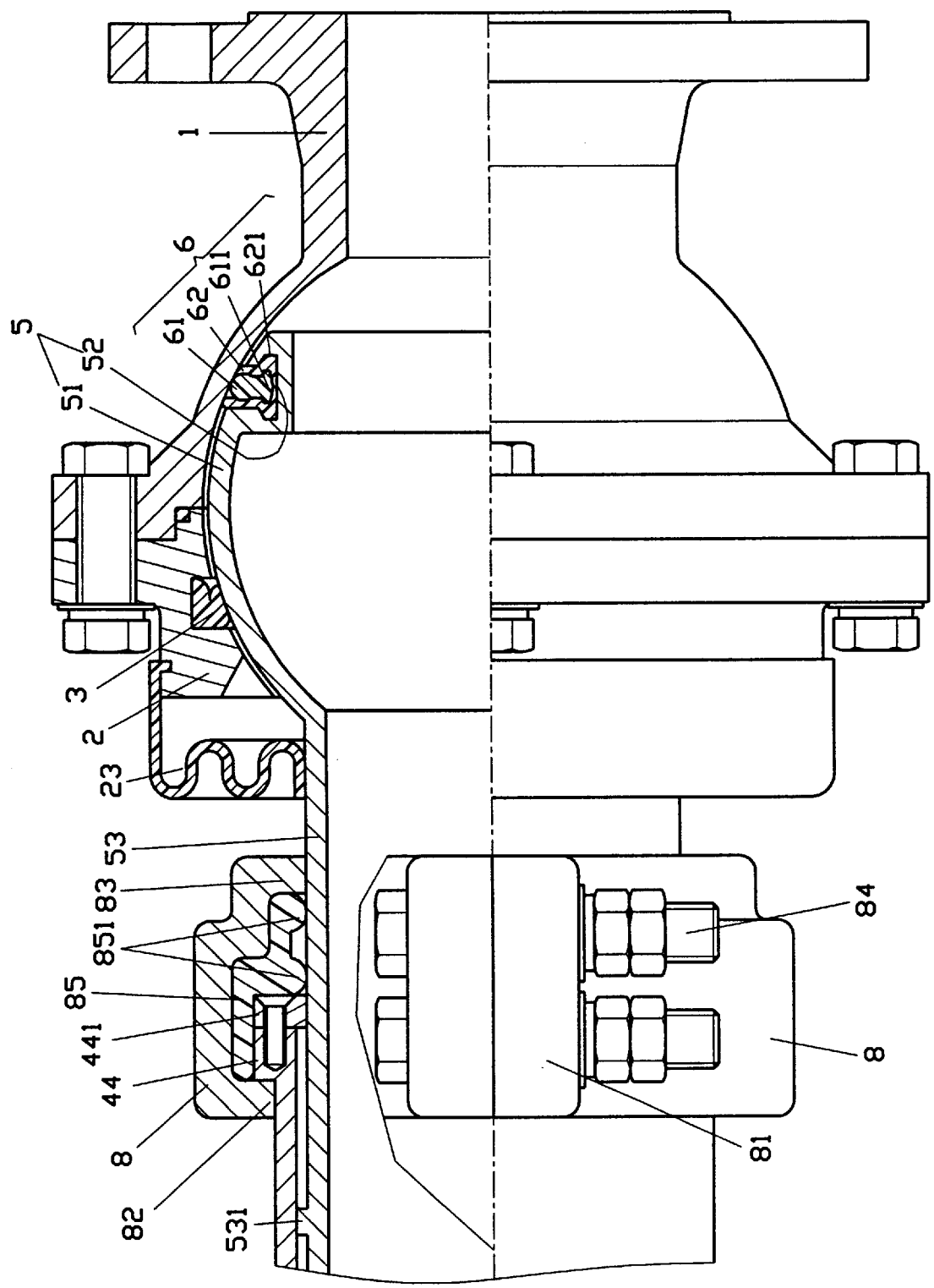
FIG. 3 is a cross sectional view showing a fixture, an inner sliding pipe, a connector and a retaining bracket of the present invention.

A leak-free flexible conduit, as shown in FIGS. 1 through 3, comprises a retaining bracket 1, a connector 2, a packing 3, an outer sliding pipe 4, an inner sliding pipe 5, a leak-free unit 6, a retainer 7 and a fixture 8.

The retaining bracket 1 is a hollow and pierce through shell comprises a through hole 11, and extending a disc 12 with a plural apertures 121 from its flange.

The connector 2 is hollow, too, with a disc 21 extending from one side of the flange, a trough 22 at inner wall, and a dust cover 23.

The packing 3 referring to FIG. 2, is a plastic circular form, with a groove 31 to provide an elasticity of the packing 3.

The outer sliding pipe 4 has a catcher 41 at one end, and a circular pipe 43 at the other end. The catcher 41 has a catching groove 42 which has a wider portion at the top end and a narrower portion at the bottom. The flat pipe 43 has a click groove 431 with a particle 432 bulges out from the center portion thereof The click groove 431 has further a block 433, and the flat pipe 43 has a stopper 44 at one end thereof which has a threaded hole for a pair of semicircular plates 441 to be fitted thereat.

The inner sliding pipe 5 has a spherical catcher 51 at one end with a groove 52 at the end, the other end of which is a circular pipe 53 having a confinement 531 thereat.

The leak-free unit 6, referring to FIG. 2A, is formed with a hardening plastic ring 61 which has a less harden leak-free padding 62 seating therein. The padding 62 is in the shape corresponding to the catcher groove 42, with a groove on the edge to increase the flexibility and to receive the plastic ring 61 therein. The plastic ring 61 has an arc shape of cross section having formed with a fin 611 at the bottom portion corresponding to and seating in the groove 621 of the leak-free padding 62.

The retainer 7, as shown in FIG. 2C, is flexible and has a fixture trough 71 at top portion and a groove 72 at one side thereof.

The fixture 8 is a pair of semi-circular hollow bases having an inner threaded rib 81 extending from it flange, and a catcher 82 at one side corresponding to the outer sliding pipe 4. The other side of the fixture 8 is formed with a confinement 83 corresponding to the inside sliding pipe 5. A leak-free ring 85 bulges out around the inner flange of the fixture 8 with the inner flange extending outwardly forming two rings 851.

To assemble, as shown in FIGS. 2 and 3, the leak-free unit 6 is inserted into the catcher groove 42 of the catcher 41 of the outer sliding pipe 4, wrap the leak-free ring padding 62 with the plastic ring 61, place the packing 3 into the trough 22 of the connector 2 and covers the connector 2 with the dust cover 23. The connector 2 is sealed on the disc 12 of the retaining bracket 1 by means of an O-ring 24 and secured to the outer sliding pipe 4. The leak-free unit 6 in the catcher groove 42 of the catcher 41 is urged by the inner flange of the retaining bracket 1 at this moment, and the rims of the plastic ring 61 and the leak-free padding 62 are engaging with retaining bracket 1 to deform, thus a leakage free unit 6 is formed. The fixture trough 71 of the retainer 7 sleeves onto the particle 432 of the trough 431 of the flat pipe 43 to confine movement of the retainer 7, and the inner sliding pipe 5 is sleeved onto another connector 2, with one end of the circular pipe 53 inserted into the leak-free ring 85, and the fixtures 8 are sleeved into the end of the outer sliding pipe 4 and are sealed by bolts 84 to the rib 81. The catcher 82 of the fixture 8 and the stopper 44 of the outer sliding pipe 4 are meshing with each other, thus secure the fixture 8 to the end of the outer sliding pipe 4, when the inner sliding pipe 4 slides outwardly, the flange of the confinement 531 shall engage with a semicircular ring 44 of the outer sliding pipe 4 to be fixed there which prevents the inner sliding pipe 5 from disengaging accidentally. When the inner sliding pipe 5 slides inwardly, the confinement 531 engages with the block 433 of the outer sliding pipe 4, even an earthquake occurred, the inner and the outer sliding pipes 5 and 4 will slide along with the movement without disengagement.

To operate, the catcher 41 of the outer sliding pipe 4 spins with the retaining bracket 1, wherein the leak-free unit 6 inserted in the catch groove 42 and the packing 3 of the connector 2 expand with the spinning of the catcher 41 which along with the restoring force, causes a leakage free character. The packing 3 and the leak-free unit 6 are meshing together in a different direction which when liquid leaking will stop immediately.

Figure 4:
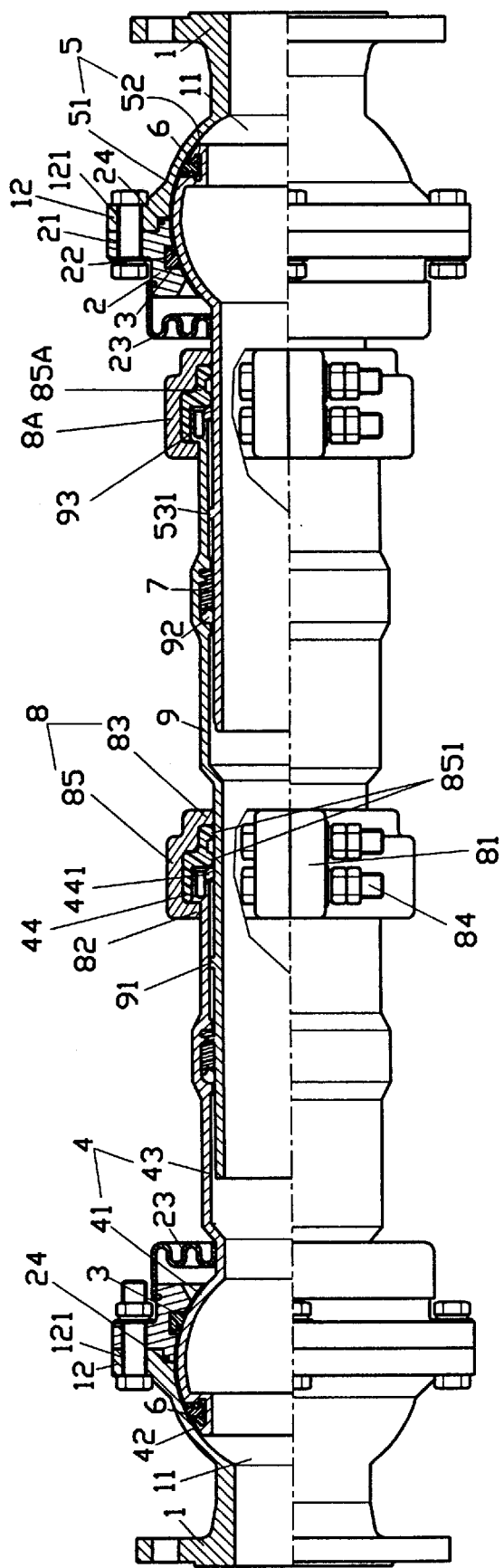
FIG. 4 is a perspective cross sectional view of the present invention.

To connect an extension, as shown in FIG. 4, the outer sliding pipe 4 may be connected to a junction pipe 9 which has an outer diameter at one end corresponding to the inner diameter of the outer sliding pipe 4 while the other end of the junction pipe 9 has a larger inner diameter than that of the outer diameter of the inner sliding pipe 5, and a block 91 is formed at the end having a small inner diameter, and a trough 92 is formed at the other inner end of the junction pipe 9 and a confinement 93 at the endmost of the junction pipe 9. To assemble, insert the end having a small inner diameter of the junction pipe 9 into the outer sliding pipe 4 and secured by the fixture 8, thus, the outer sliding pipe 4 and the junction pipe 9 are connected together, insert the inner sliding pipe 5 into the junction pipe 9 from the end having a larger diameter and secured again by the fixture 8 and a leak-free sleeve 85 to form a longer pipe.

Figure 5:
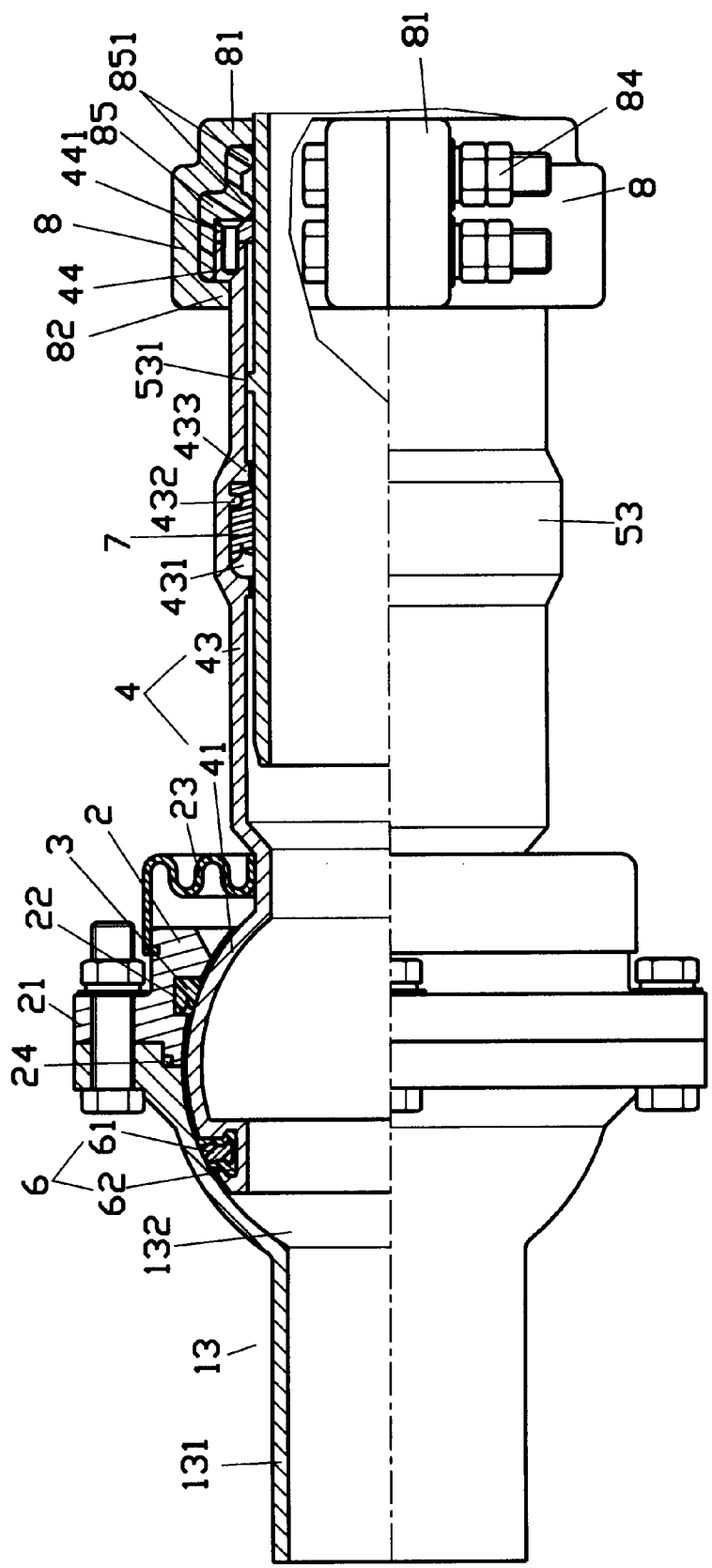
FIG. 5 is a s perspective cross sectional view of a second embodiment of the present invention.
Figure 6:
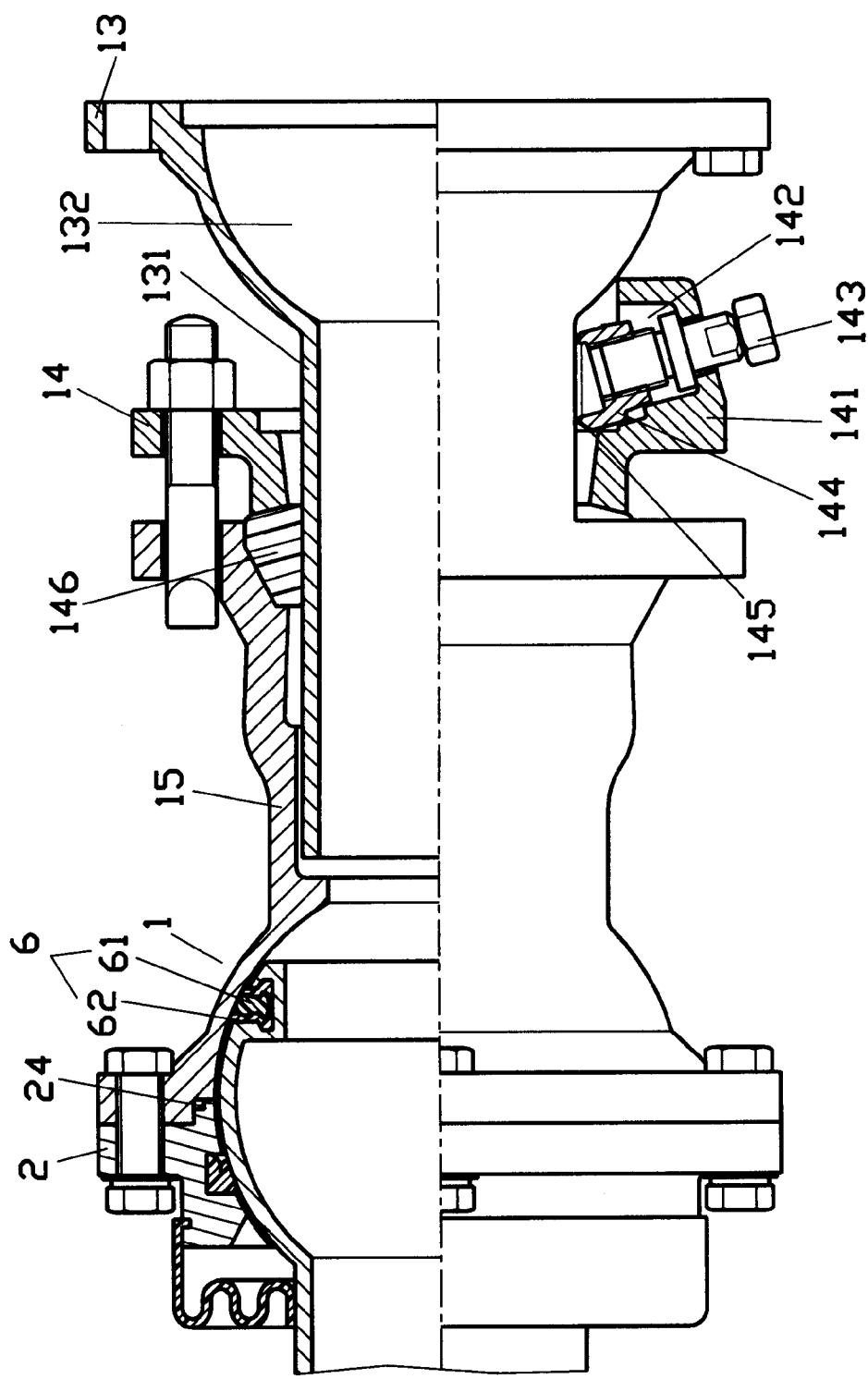
FIG. 6 is a s perspective cross sectional view of a third embodiment of the present invention.

Referring to FIG. 5, this invention may be adapted with a seat 13 which has one end formed with a flat pipe 131 with a circular trough 132 at the end for receiving the catcher 41 of the outer sliding pipe 4 therein, the trough 132 has extending a disc for connection with pipes of different sizes.

In order to maintain a stable condition, the pipe flat pipe 131 of the seat 13 has a ring seat 14 which has extends a pair of blocks 141 from respect sides and each block 141 has a trough 142 for a push rod 143 to insert there through, the push rod 413 has a slope block 144 at top end with a pair of fix rings 145 extending from respective sides thereof and are set in different height. To assemble, insert a sleeve ring 146 from the flat pipe 131 to the seat 13 and connect with the sleeve 15 extending from the ring seat 14 corresponding to the retaining bracket 1, and the sleeve ring 146 sticks between the sleeve 15 and the ring seat 14, with the push rod 143 spins to urge the block 144 move downwardly. The fix ring 145 is pushed by the push rod 143 to engage with the flange of the flat pipe 131 of the seat 13, thus when pipe shakes, the block 144 shall prevent the seat 13 from disengaging.

Figure 7:
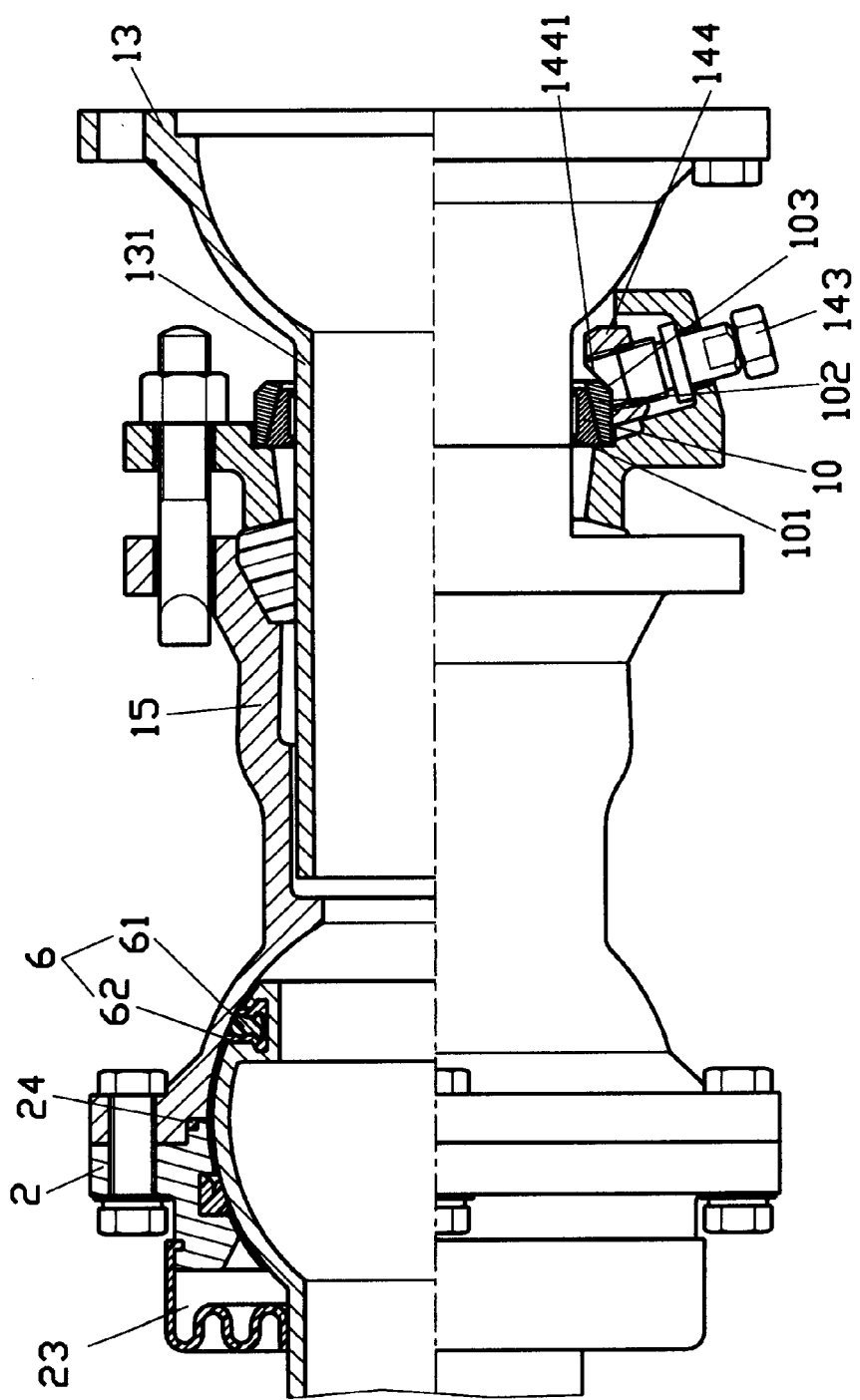
FIG. 7 is a s perspective cross sectional view of a fourth embodiment of the present invention.
Figure 8:
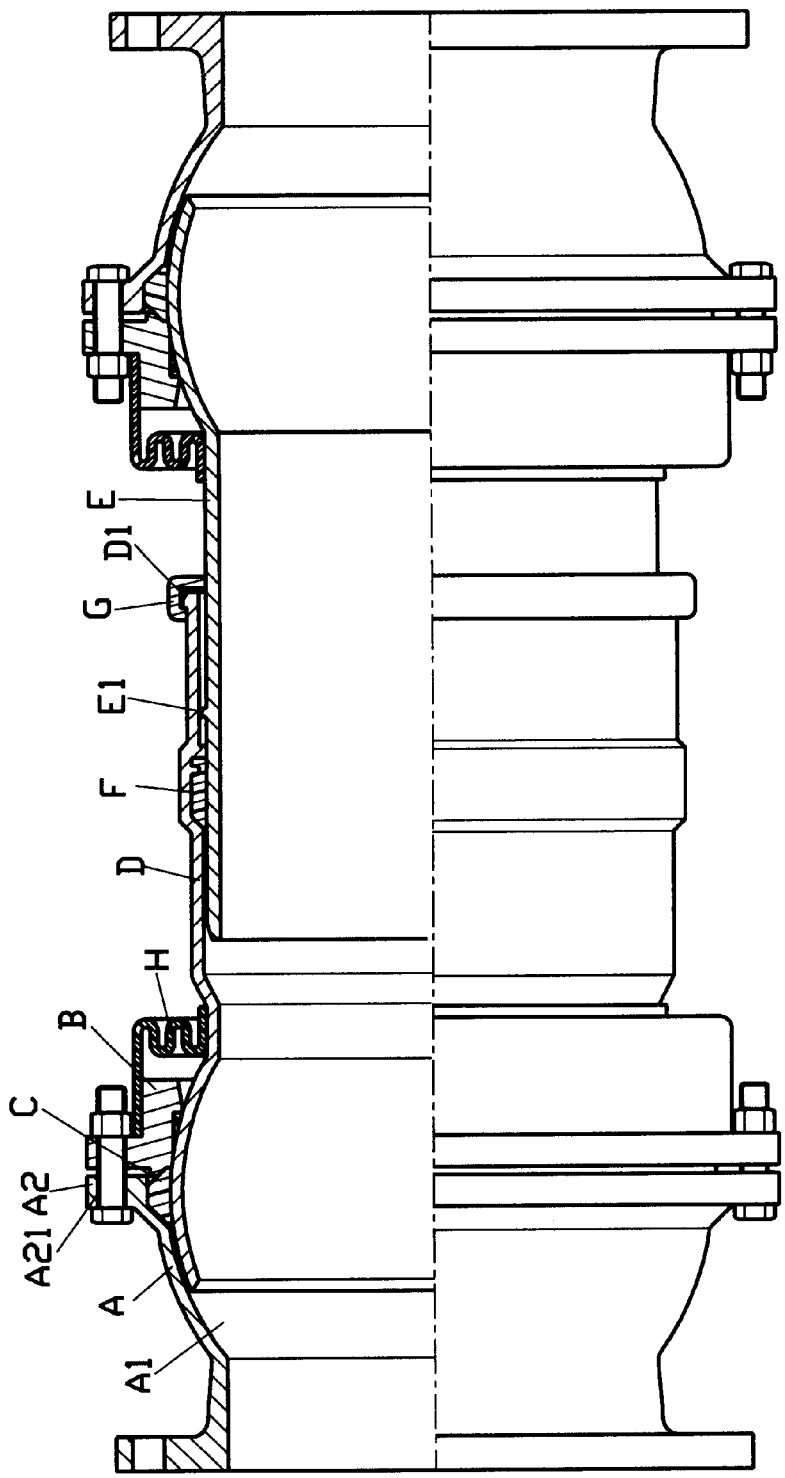
FIG. 8 is a s perspective cross sectional view of a prior art.

Referring to FIG. 7, this invention may be made of plastic or rubber pipe, place the flat pipe 131 of the seat 13 against the ring 10 which has slope at its flange and a number of locating ring 101 extending from the inner flange of the ring 10. The ring 10 is sleeved with a fix ring 102 from outside thereof, the fix ring 102 has a slope 103 at inside corresponding to the slope of the outer flange of the ring 10 and engages with the push rod 144 at one end, the center portion of the push rod 144 is formed with a slope surface 1441 which, when the push rod 143 pushes the push rod 144 upwardly, the slope surface 1441 and the slope surface 103 will push the ring 10 and the fix ring 102 will move towards the ring 10 forces the locating ring 101 secured to the flat 131 of the seat 13.

I claim:

1. A leak resistant conduit system comprising:
   (a) axially extended inner and outer sliding pipes slidably coupled one to the other, each said inner and outer sliding pipe having an open catcher section describing a domed contour and a pipe section extending therefrom, said catcher section having formed therein an annular groove defined by inner and outer radial portions, said inner radial portion being greater in a width dimension than said outer radial portion;
   (b) at least one retaining bracket coupled to said catcher section of at least one of said inner and outer sliding pipes;
   (c) at least one connector coaxially coupled to said retaining bracket to capture said catcher section of said one sliding pipe;
   (d) a packing captured between said connector and said catcher section; and,
   (e) at least one leak-free unit captured between said retaining bracket and said catcher section, said leak-free unit including:
      (1) a leak-free padding member seated in said groove of said catcher section in substantially conforming manner; and,
      (2) a plastic ring coaxially engaging said leak-free padding member, said plastic ring having at least one axially extending fin portion for locking said engagement of said leak-free padding member.

2. A leak resistant conduit system comprising:
   (a) axially extended inner and outer sliding pipes slidably coupled one to the other, each said inner and outer sliding pipe having an open catcher section describing a domed contour and a pipe section extending therefrom, said pipe section of said outer sliding pipe having formed thereon a radially bulging portion defining an inner annular click groove;
   (b) at least one retaining bracket coupled to said catcher section of at least one of said inner and outer sliding pipes;
   (c) at least one connector coaxially coupled to said retaining bracket to capture said catcher section of said one sliding pipe;
   (d) a packing captured between said connector and said catcher section, said packing including an annular plastic member having a grooved axial face; and, (e) a flexible retainer coaxially captured between said inner and outer sliding pipes, said retainer being disposed within said click groove of said outer sliding pipe, said retainer having a fixture trough formed to extend radially therein and a groove extending axially therein.

3. A leak resistant conduit system comprising:

(a) axially extended inner and outer sliding pipes slidably coupled one to the other, each said inner and outer sliding pipe having an open catcher section describing a domed contour and a pipe section extending therefrom, said pipe section of said outer sliding pipe terminating at a stopper section, said stopper section having coupled thereto at least one semi-annular plate, said semi-annular plate being less in inner diametric dimension than said pipe section;

(b) at least one retaining bracket coupled to said catcher section of at least one of said inner and outer sliding pipes;

(c) at least one connector coaxially coupled to said retaining bracket to capture said catcher section of said one sliding pipe;

(d) a packing captured between said connector and said catcher section;

(e) a fixture including a pair of semi-annular bases coupled one to the other about said slidably coupled inner and outer sliding pipes, at least one of said bases having formed therein axially offset catcher and confinement segments for limiting the axial displacement relative thereto of said outer sliding pipe; and, (f) a leak-free ring captured at least partially about said inner sliding pipe by said fixture, said leak-free ring having a pair of axially offset ring protrusions extending radially inward to engage said pipe section of said inner sliding pipe.

4. The leak resistant conduit system as recited in claim 3 further comprising:

(a) a seat coupled to said catcher section of at least one of said inner and outer sliding pipes, said seat having a hollow section describing a domed contour and a seat pipe section extending therefrom, said hollow section having formed thereon a radial mounting flange;

(b) a ring seat coaxially coupled to said seat pipe section, said ring seat including a pair of opposed blocks defining a trough, a slope block captured within said trough by at least one said block, at least one fix ring received by said slope block, and a push rod displaceably coupled to at least one said block and for adjustably pressing said fix ring towards said seat pipe section; and, (c) a sleeve ring coaxially captured between said ring seat and said seat pipe section.

5. The leak resistant conduit system as recited in claim 4 wherein said ring seat further includes:

(a) a locating ring disposed about said seat pipe section; and, (b) a ring coaxially coupled to said locating ring, said ring having a sloped outer surface portion;

said fix ring having a sloped inner surface portion engaging said sloped outer surface portion of said ring, said fix ring having a sloped outer surface portion.

6. The leak resistant conduit system as recited in claim 5 wherein said push rod of said ring seat includes a sloped end surface portion for camming engagement of said sloped outer surface portion of said fix ring.

\* \* \* \* \*